United States Patent [19]
Pace

[11] Patent Number: 5,179,823
[45] Date of Patent: Jan. 19, 1993

[54] VARIABLE MULCHING MOWER WITH EDGER ATTACHMENT

[76] Inventor: Sang H. Pace, 3802 Greenshadow, Pasadena, Tex. 77503

[21] Appl. No.: 882,756

[22] Filed: May 11, 1992

Related U.S. Application Data

[63] Continuation of Ser. No. 734,607, Jul. 23, 1991, abandoned.

[51] Int. Cl.$^5$ ............... A01D 34/62; A01D 34/73; A01D 34/74; A01D 34/84; A01D 73/18
[52] U.S. Cl. ................................. 56/16.9; 56/17.2; 56/17.4; 56/17.5; 56/255; 56/295; 56/320.2
[58] Field of Search .................. 56/16.7, 16.9, 17.2, 56/17.4, 17.5, 255, 295, 320.1, 320.2; 172/13

[56] References Cited

U.S. PATENT DOCUMENTS

| | | | |
|---|---|---|---|
| 2,942,400 | 6/1960 | Sylvester | 56/17.4 X |
| 2,957,295 | 10/1960 | Brown | 56/17.5 X |
| 3,162,990 | 12/1964 | Cook | 56/295 |
| 3,396,518 | 8/1968 | Johnson | 56/17.5 X |
| 3,531,923 | 10/1970 | De Lay | 56/17.5 X |
| 4,257,214 | 3/1981 | Ferguson | 56/320.2 X |
| 4,426,831 | 1/1984 | Klas et al. | 56/295 X |
| 4,428,184 | 1/1984 | Hoff | 56/295 |
| 4,478,028 | 10/1984 | Dawson, Jr. | 56/16.9 |
| 4,528,805 | 7/1985 | Zitta | 56/16.9 X |
| 4,942,726 | 7/1990 | Bowditch | 56/17.5 X |

*Primary Examiner*—George A. Suchfield
*Attorney, Agent, or Firm*—Marvin J. Marnock

[57] ABSTRACT

A motor-powered mulching mower and edger apparatus (20) with dual rotary mower blades (33,35), a mower deck (21) and a side-mounted edger attachment (75) adapted by a clutch mechanism (110,111) for simultaneous operation therewith. An adjustable mulching control valve (60) mounted at the inlet of a discharge chute (39) from the deck (21) allows variation of the proportions of mulching to clippings bagging in the range of zero to one hundred percent during mower operation. The dual rotary blades (33,35) are mounted in vertically spaced relation and select leading-angle trailing-angle relationship and are cooperable with an internal deck-mounted air stream deflector (68) for deflecting multiple cuttings of grass clippings in an inwardly directed spiral path such that after the initial cutting, each of the clippings is disposed to at least two more cuttings to produce a finer mulch. The edger (75) is provided with an edger blade guard (109) which can be adjustably positioned to deflect and guide edger-produced clippings to the interior of the mower deck (21) in an air stream which enforced the air stream generated by the mower blades (33,35) and enhances vacuuming capability of the apparatus (20). Swivel-mounted castor wheels (25,26) at the front of the mower deck (21) and an off-set of the front wheel (25) and real wheel (27) nearest the edger (75) towards the center line of the apparatus (20) facilitates the operation of the edger (75) in a curved path.

22 Claims, 8 Drawing Sheets

VARIABLE MULCHING MOWER WITH EDGER ATTACHMENT

This application is a continuation of application Ser. No. 07/734,607 filed Jul. 23, 1991, now abandoned.

FIELD OF THE INVENTION

This invention relates to motor-driven grass cutting apparatus for the care and maintenance of lawns and more particularly to a combined rotary lawn mower and edger which can also be used as a mulcher with means for varying the relative proportions of mulching and clippings collection.

In the art of lawn care as it relates to the trimming and edging of lawns there is a predominant reliance on rotary type mowers having a cutting blade arranged for rotation in the horizontal plane for trimming the lawn to a desired height and on the use of powered edgers with a rotary blade adapted for rotation in the vertical plane for trimming the edges of the lawn to produce a neat appearance. Rotary mowers may be provided with either side or rear discharge ports and might also be equipped with a grass catcher bag for the collection and bagging of the discharged lawn clippings. The rotary mower has also been adapted as a mulching lawn mower which is designed to cut the grass clippings into smaller particles and return them back to the lawn.

Rotary mowers and edgers may either be powered by an electric motor or a gasoline motor. In some instances, powered edgers and mowers have been combined in a single apparatus wherein both use a common power source.

The conventional mulching lawn mower is designed with a deeper vertically dimensional blade housing, commonly referred to as a "deck", than the ordinary mower designed for clippings discharge and collection. It is also provided with a multi-pitch blade with specially curved surfaces such that the outer section of the blade is adapted to pull the grass up and cut it. The rotation of the curved blade sets up a powerful air flow which suspends and swirls the cut grass above the blade. The extra-deep deck is sometimes made in an approximate toroidal or "doughnut" shape to assist in maintaining the swirling and suspension of the grass particles. However, the suspending of the grass clippings can occur for so long a time as to place a heavy load on the rotating blade and cause a decrease in its rate of rotation with the result of inefficient mulching. The ordinary mower can be converted to a mulching mower by replacing its cutting blade with a special mulching blade and inserting a plug in its discharge chute. The interior of its deck may also be provided with a plurality of deflectors located circumferentially about its inner surface above the mulching blade such that the suspended particles can be guided back into the rotating blade to be re-cut. However, such deflectors tend to interfere with the cutting of grass and to reduce the angular velocity of the air stream whereas a large angular velocity is needed when one elects to bag the grass with the discharge plug removed. It will thus be apparent that even though the mower is converted to a rear bagging mower, the apparatus keeps on mulching to some degree whether desired or not.

SUMMARY OF THE INVENTION

The present invention is a lawn trimming apparatus comprising a rotary mower with an edger attachment. The apparatus comprises a mobile deck member having an upper platform and a pair of front wheels and a pair of rear wheels mounted thereto. The deck member has a deck skirt member extending downwardly from along the periphery of said upper platform to a spaced distance above the plane defined by the lower surfaces of said wheels. The apparatus is powered by a motor mounted on the deck member with its motor drive shaft extending downwardly through the deck platform. Dual cutting blades are mounted on the motor drive shaft. An elongate primary rotary cutting blade is affixed substantially at its mid-point to the motor drive shaft in a substantially perpendicular radial orientation with respect to the shaft axis. A secondary rotary cutting blade is similarly affixed at its mid-point to the motor drive shaft in vertically spaced relation above the primary blade but at an acute leading angle with respect to the primary blade as viewed with respect to their direction of rotation. The primary blade is provided at its end portions with upwardly facing surfaces of greater pitch extending to the blade ends which surfaces induce a vortex-like air stream within the deck member upon rotation of the primary blade. A discharge chute is mounted to the deck member with its inlet communicating with the interior space of the skirt member below the deck platform. The apparatus is also provided with a deflector formed by an inwardly curving projection of a portion of the deck skirt whereby the air stream created by rotation of the blades is adapted to carry the grass clippings produced by the cutting action of the primary blade in a spirally curving path toward the rotation axis of the blades whereby the clippings are cut into finer particles by at least a second cutting by the secondary blade and a third cutting by the primary blade.

The apparatus also includes a variable mulching control valve which is selectively operable for varying the mulching rate and the relative proportion of clippings discharged through the discharge chute for bagging as compared to the proportion of clippings returned to the lawn as mulch.

The apparatus also includes an edger assembly mounted on one side of the deck member and connected to a power take-off shaft which extends laterally from the motor drive shaft and is coupled to the motor drive shaft by a gear connection. The edger assembly includes an edger arm pivotally mounted at one end to the deck member and provided at its other end with an edger blade adapted for rotation in a vertical plane. A pulley assembly and V-belt drive which are controllable by a normally operated clutch means are provided for driving the edger blade or halting its operation.

The edger is also provided with an edger blade guard which can be adjustably positioned to deflect and guide edger clippings to the interior of the mower deck in an air stream which enforces the air stream generated by the mower blades and enhances the vacuuming capability of the apparatus. Swivel-mounted caster wheels at the front of the mower deck and an off-set of the front wheel and rear wheel nearest the edger towards the center line of the apparatus facilitates the operation of the edger in a curved path.

BRIEF DESCRIPTION OF THE DRAWINGS

FIG. 13a is another perspective view of the edger blade guard of FIG. 13 for illustrating its appearance from a different perspectus;

DETAILED DESCRIPTION OF THE INVENTION

Figure 1:
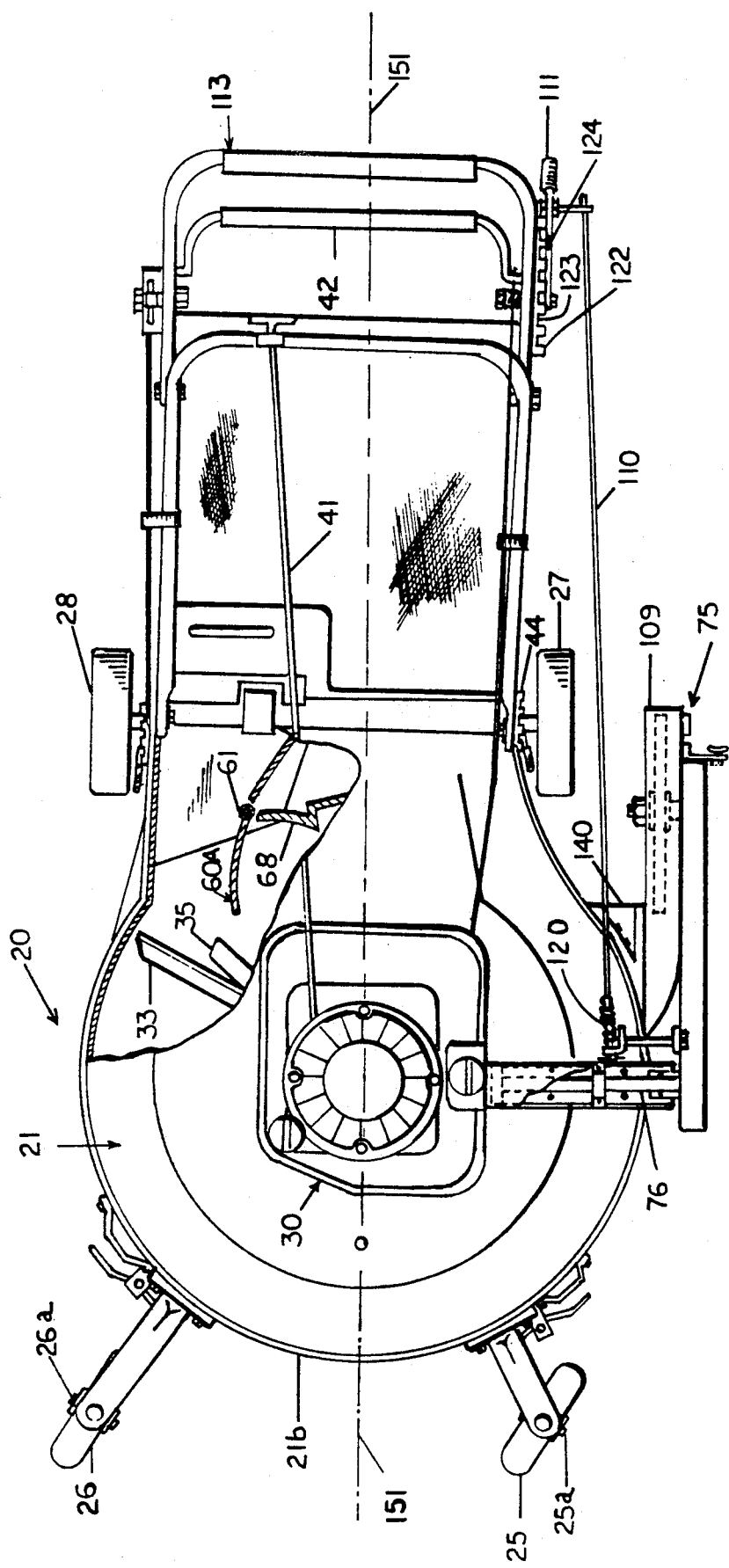
FIG. 1 is a top plan view of a mowing apparatus comprising an adjustable mulching mower with edger attachment constructed in accordance with the invention, and showing parts broken away for purposes of illustration.
Figure 2:
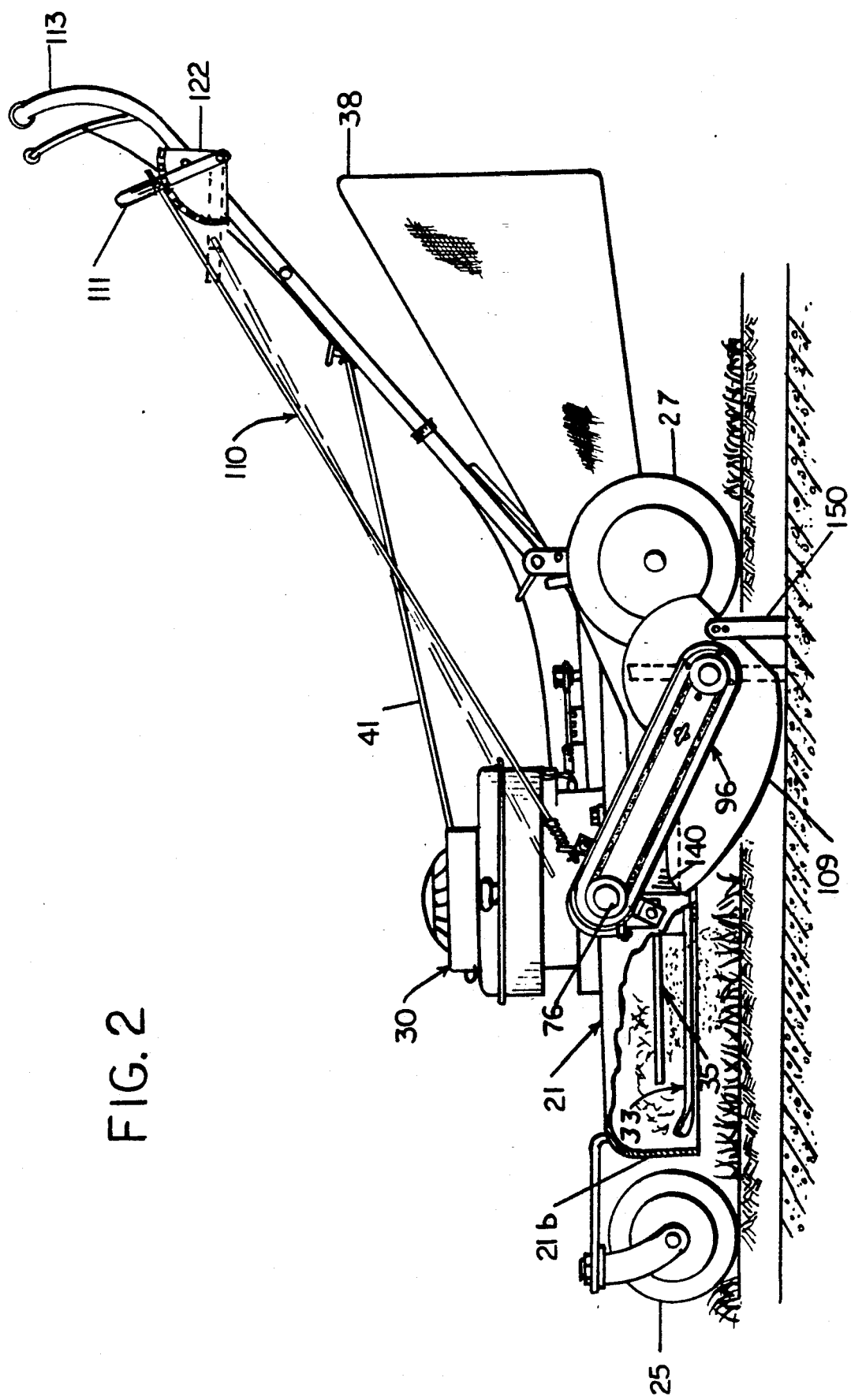
FIG. 2 is a side elevational view of the mowing apparatus of FIG. 1 with parts thereof broken away for purposes of illustration.

Referring more particularly to the drawings, there is shown in FIGS. 1 and 2, a combined mower and edger apparatus 20 which is operable as a mulching mower for the care and maintenance of lawns and as an edger for trimming the edges of the lawn. The apparatus 20 comprises a rotary lawn mower portion which includes a blade housing or deck 21 having an upper platform surface 21a and a depending downwardly directed skirt 21b which extends around the periphery of the platform 21a. A pair of front wheels 25,26 are mounted on the skirt 21b in front of the deck 21 and a pair of rear wheels 27,28 are rotatably mounted on the skirt 21b at the rear end of the deck 21 on opposite sides thereof.

Figure 3:
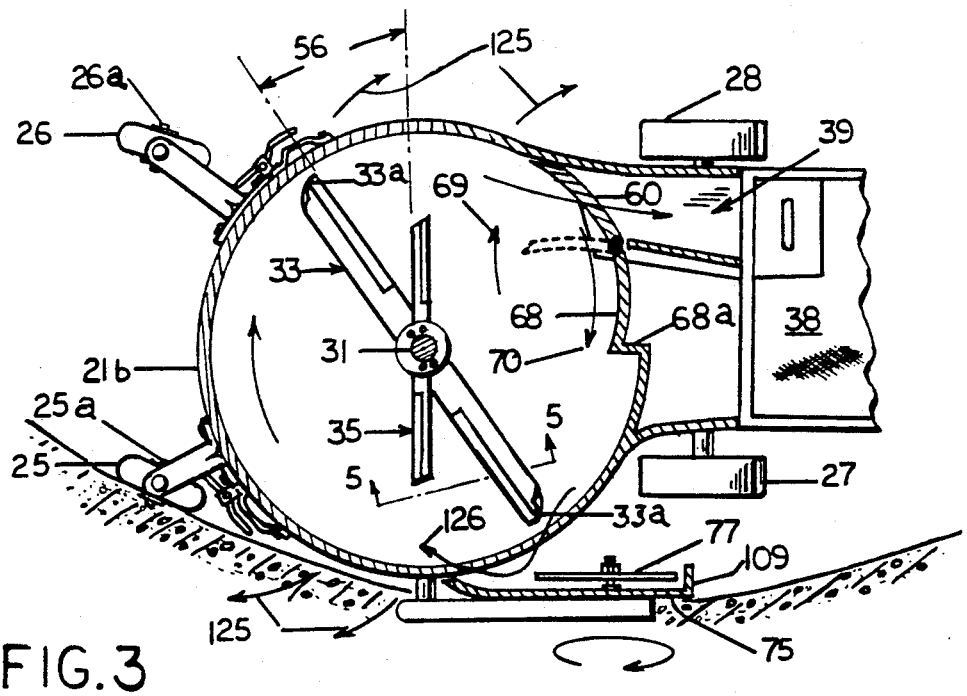
FIG. 3 is a fragmentary view taken along the sectional line 3—3 in FIG. 4 for illustrating the operational theory of the invention.
Figure 4A:
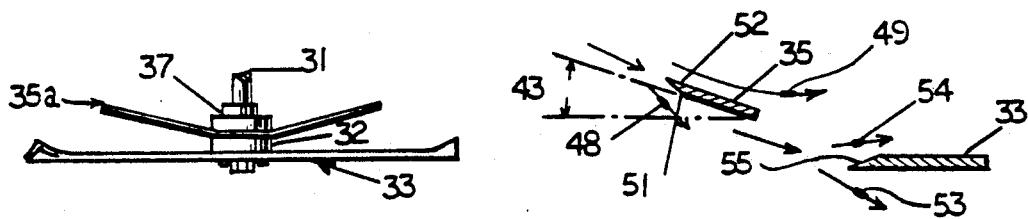
FIG. 4a is a fragmentary side view of a cutting blade assembly for the apparatus which shows a modified form of a secondary cutting blade which can be used with the invention.
Figure 4:
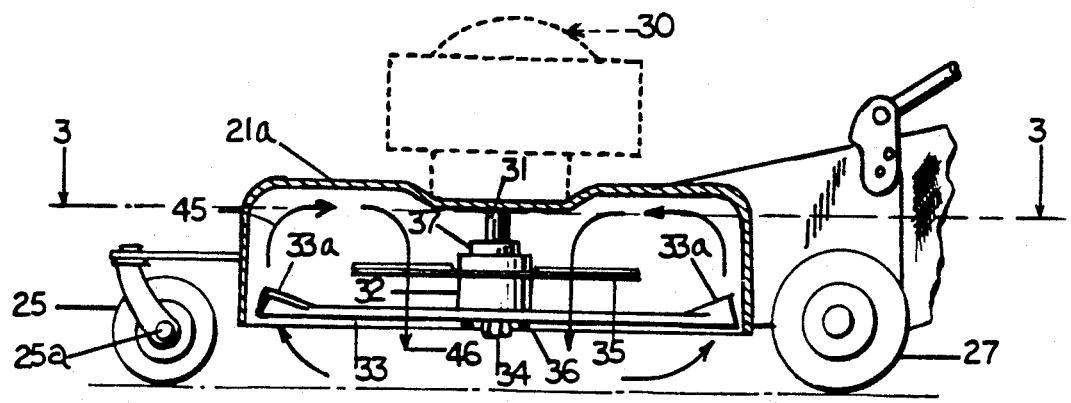
FIG. 4 is a side elevational view of a portion of the apparatus showing the cutting blade assembly inside the deck and illustrating the mulching theory of operation for the apparatus.

The apparatus 20 also includes a prime mover, such a gasoline motor 30 which is mounted atop the deck 21 in conventional fashion with its motor drive shaft 31 extending through the opening in the platform 21a as shown in FIG. 4 and on which is attached an elongate primary blade 33 at the end of the shaft by a bolt 34 through an opening at the center of the blade. A secondary blade 35 is also attached to the drive shaft 31 above the primary blade 33 and spaced vertically thereabove by means of an annular spacer member 32 which is sleeved about the shaft 31. The secondary blade 35, which is also provided with a central opening for accommodating its installation on the shaft 31 is secured by two small bolts 36, each of which extends on opposite sides of the shaft 31 through aligned holes provided in the primary blade 33, the spacer member 32, the secondary blade itself, and a hub 37 of the shaft 31. As best seen in FIG. 3, the blades 33,35 are arranged on the shaft 31 in a selected angular relationship relative to one another for purposes to be hereinafter described and are adapted for rotation in the clockwise direction within the deck 21 at a distance above the ground suitable for mowing the grass to a desired height.

It is therefore to be noted, that aside from the provision of dual rotary cutting blades, the portion of the apparatus heretofore described is substantially similar to a conventional rotary mower. Also, as in a typical rotary mower the apparatus is provided with a readily detachable grass catcher bag 38, which is mounted in conventional fashion at the rear of the deck 21 on the end of a discharge chute 39 for receiving the grass clippings as they are discharged from the chute. Also, as seen in FIG. 1, a pull cord 41 is provided as a means for starting the gasoline motor and an engine STOP lever 42 is provided in conventional mechanical connection with the motor for stopping motor operation when released from its motor operating position. A conventional transmission (not shown) is also provided. A rear wheel height adjuster 44 of conventional type is also provided for adjusting the relative positioning of the rear wheels with respect to the deck 21 and the height of the rear end of the deck above the ground.

Figure 5:
FIG. 5 is a schematic view as taken along the section line 5—5 of FIG. 3, illustrating the orientation of the dual blades of the apparatus, and illustrating the mulching theory of operation for the apparatus.

The operation of the rotary lawn mower component of the invention with a variable mulching capability is best illustrated with reference to FIGS. 3, 4 and 5. As the lawn mower moves forward when the transmission is in forward drive position, the grass is first cut by the leading edge of the primary blade 33 as it rotates in the clockwise direction as viewed in FIG. 3 and leaves behind a swath of cut grass. The grass clippings are moved forward in a circular clockwise path within the blade housing 21 carried in an air stream induced by rotational velocity of the blades 33,35 and the curved inner wall of the deck skirt 21b. An upward curvature of the trailing edges of the blade 33 at its end portions 33a creates an enhanced air lift such that the clippings are uplifted in a vortex-like movement as indicated by the arrow 45 in FIG. 4. The interior of the deck above the rotating blades becomes saturated with grass clippings as the mowing is continued and the clippings tend to remain in a circular path owing to centrifugal force, the continuing fanning action of the blades and the lower air pressure near the periphery of the deck relative to the pressure nearer the center of the deck created by the Bernoulli Effect. After saturation occurs, clippings are pushed toward the center of the deck by the continuing increase in grass clippings and the crowding action of the clippings themselves thereby resulting in a decrease in their angular velocity as the radius of their curved path decreases. Since the deck is enclosed at its top and sides along the circular peripheral path, the clippings near the center of the deck adjacent the motor drive shaft 31 with their continuing loss of angular velocity are caused to descend as indicated by the arrow 46 in FIG. 4. With reference to FIG. 5, it is shown that a descending clipping is engaged and split in two portions 48,49 by the leading edge of the rotating secondary blade 35. The lower particle 48 follows the airstream under the secondary blade 35 while the upper particle 49 follows the airstream above the blade 35. The cutting edge of the upper secondary blade 35 is defined by the intersection of its flat upper surface 52 with a beveled edge 51 which is angled downwardly and tends to drive the clipping particle 48 downwardly towards the path of the primary blade 33 where it is most likely to be cut again into even finer particles, such as the particles 53,54. The upper surface 52 of the secondary blade 35 at its leading edge faces upwardly at a positive angle of attack with respect to the horizontal plane as would produce an enhanced downdraft for quicker discharge of the clippings to the ground. Also, the cutting edge of the primary blade 33 is formed by the intersection of its flat undersurface and an upward facing beveled edge 55 which lifts the upper clipping particle 54 into the air stream to increase the probability of its further cutting.

It is therefore to be appreciated, that although the lower primary blade 33 performs the initial cut of grass, a second cutting of the clippings into particles is initiated by the secondary blade 35 as illustrated in FIG. 5 with further re-cutting into even finer particles by the primary blade 33 such that practically all the initial clippings are cut at least twice more but probably even more times since there is a very high probability that the upwardly directed particles 49,54 as shown in FIG. 5 are likely to be cut again by either or both of the blades 33,35.

Since the process of re-cutting the initial clippings into finer particles is initiated by the secondary blade 35, it may be said to be at a leading angle with respect to the primary blade 33. The particular lead angle 56 shown in FIG. 3 and the positive angle of attack 43 in FIG. 5 are selected so as to result in maximum efficiency with ample cutting of the grass particles to provide a desirable mulch. This angle should be selected for a particular rotational speed of the dual blades and preferably the fastest revolutions per minute of the motor shaft 31, both of which can be determined by wind tunnel testing for most efficient mulching.

It is also to be noted that the secondary blade 35 is of shorter length than the primary blade and thereby avoids interfering with the vortex air stream and the circular path of the clippings about the inner periphery of the deck. For each blade the outer end portions of the blade are provided with a cutting edge such that only the central one-third portion of the blade does not have a cutting edge.

The conventional mulching mower tends to cut the grass only twice, an initial cutting and a single re-cut. On the other hand, the multi-bladed system of the present invention performs multiple cuttings resulting in a finer mulch for the lawn.

It is also to be appreciated that conventional mulchers do not perform well and their use is not recommended when the grass exceeds more than an inch in height. This undesired feature of conventional mulching mowers is not a problem with the mulching mower of this invention which can perform well for any height at which the grass can be cut. This is a particularly beneficial feature in geographic areas where the grass grows thickly as in many portions of the southern U.S.A. When the grass is unusually high and thick it would be especially desirable to provide for partial mulching and partial bagging of the clippings.

A modified form of secondary cutting blade 35a which can be used in lieu of the cutting blade 35 of FIG. 4 is shown in FIG. 4a. The cutting blade 35a is formed identical to the blade 35 except that the blade portions extending from both sides of the hub 37 are each turned upwardly at an angle of dihedral of approximately ten degrees. The end portions of the blade 35a, because of their uplifted tips, push the clipping particles outwardly and thereby causes the apparatus to produce finer mulching because of the finer cutting produced by the greater angular velocity of the end portions and tips of the lower rotary blade 33.

Figure 6:
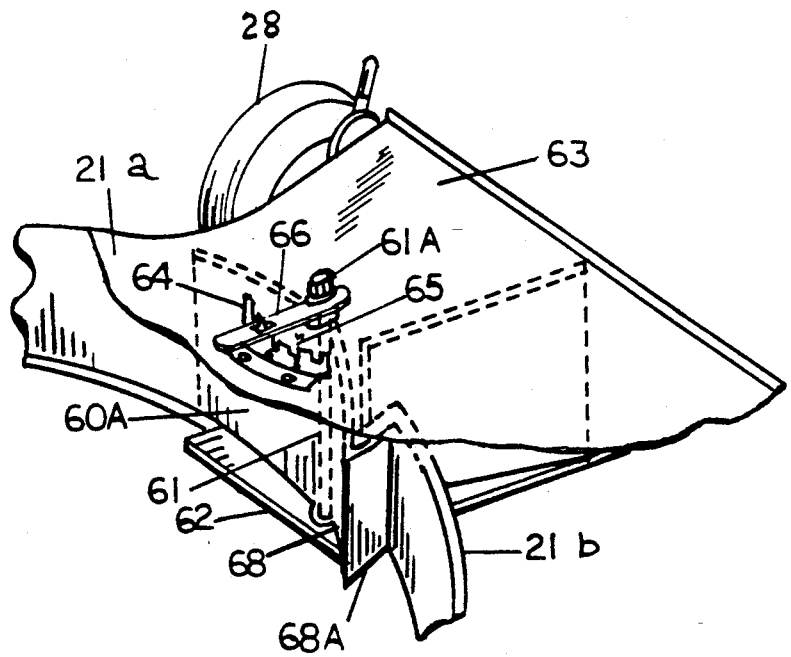
FIG. 6 is a fragmentary perspective view of a portion of the invention and showing an adjustable mulching control valve located at the inlet end of the exhaust chute of the apparatus.

A variable mulching feature is provided for the mulching mower of the present invention by the provision of a mulching rate control valve 60 with an associated variable control mechanism. As shown in FIGS. 1 and 6, the valve 60 comprises a valve element in the form of a door 60A which is installed in the side wall or deck skirt 21b at the inlet of the exhaust discharge chute 39 and adapted for pivotal movement about a pivot pin 61 mounted in the bottom plate 62 and top plate 63 of chute 39 adjacent skirt 21b in conventional fashion. The valve element 60A may be positioned in a fully open position as shown in dashed lines in FIG. 3 such that substantially 100 percent of the clippings are delivered to the grass catcher bag 38 and there is no mulching. The valve element 60A may also be positioned in a fully closed position as shown in FIG. 6 wherein the discharge chute is closed and there is substantially 100 percent mulching and zero percent clippings collection for bagging.

Under some conditions, it may be desirable to adjust the amount of clippings returned to the soil during a mowing operation. In the present invention this can be accomplished by adjusting the degree of closure of the valve 60 by placing the valve element 60A at any position between its fully closed and fully open positions. For this purpose an indexing guide 64 represented by an arcuate metallic member with angularly spaced notches 65 formed in its upper edge is attached by welding or other means to the top of the deck 21 adjacent the pivot pin 61. Preferably the guide 64 is provided with a radius of curvature such that the pivot pin 61 is located at the center of the arc defined thereby. A pliant metallic handle 66 is attached at one end to the pivot pin 61 below the hexagonal head 61A of the pivot pin in an orientation extending radially from the pin. An arcuate movement of the handle 66 results in a corresponding arcuate movement of the valve element 60A which adjusts the degree of closure of the inlet to the discharge chute 39. By lifting the free end of the pliant handle 66 and placing it in a selected one of the notches 65 in the index guide, the valve element 60A can be fixed at any selected intermediate position between the fully open and fully closed positions. At such an intermediate position, only a portion of the grass clippings which circulate in the deck 21 during a mowing operation are discharged through the chute 39 to the grass collection bag 38 — the portion of clippings which are not discharged through the chute 39 being further clipped in the mulching operation and returned to the soil as mulch. The notches 65 located at the ends of the index guide define the fully open and fully closed positions of the valve 60. It is thus to be seen that a means for varying the rate of mulching and the proportion of mulching to clippings collection during a mowing operation is provided by the adjustable valve 60.

It is also to be noted that the curvature of the valve element 60A conforms to the curvature of the wall skirt 21b. However, the portion of the skirt 21b extending from the pivot pin 61 in the clockwise direction as seen in FIG. 3 is formed with a gradually increasing curvature such that this portion serves as an inward deflector 68 for the circulating air stream and clippings. A portion 68A of the skirt 21b extends in a radial direction of the axis of the motor shaft 31 and joins the end of the deflector 68 with the portion of the skirt 21b of constant curvature. Accordingly, when the valve element 60A is moved in the direction of arrow 69 to the fully closed position, the deflector 68 acts as an airflow guide which directs the circulating clippings in a spiral path towards the center of the deck and the secondary blade 35 as indicated by arrow 70 in FIG. 3 to speed the discharge of clippings to the soil in the mulching operation and lessen the load on the motor 30, thereby increasing the rotary speed of the blades 33,35 to produce finer clippings and greater efficiency. While the deflector 68 is most effective in the 100 percent mulching mode of operation, it is no longer effective in the bagging mode of operation.

The present invention also includes an edger 75 of the rotary blade type which is adjustably mounted for limited pivotal movement between operative and inoperative positions adjacent the rim of the deck 21 at a location between the front and rear wheels of the apparatus 20. The edger 75 is powered by a power take-off shaft 76 connected by a gearing arrangement with the drive shaft 31 of the motor 30. In operating position, the edger is oriented such that the edger blade 77 rotates in a vertical plane parallel to the longitudinal axis of the apparatus 20 and thus at a right angle to the plane of rotation of the mower blades 33,35. The direction of the edger blade rotation is also such that the air stream generated by its rotation is in an additive enforcing relationship to the air stream produced by the rotary blades 33,35 and thereby produces an enhanced suction effort for vacuuming the grass clippings and debris produced as a result of edging. The edger is also adapted for operation simultaneous with that of the mower blades 33,35 but may be deactivated when placed in the inoperative position.

Figure 7:
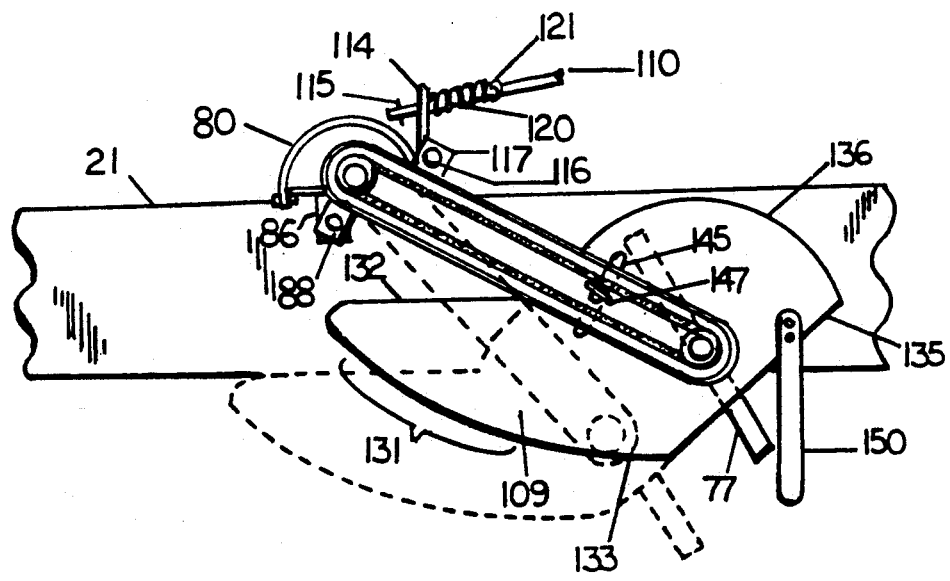
FIG. 7 is a fragmentary side elevational view of the edger of the invention showing the edger in the process of operation.
Figure 9:
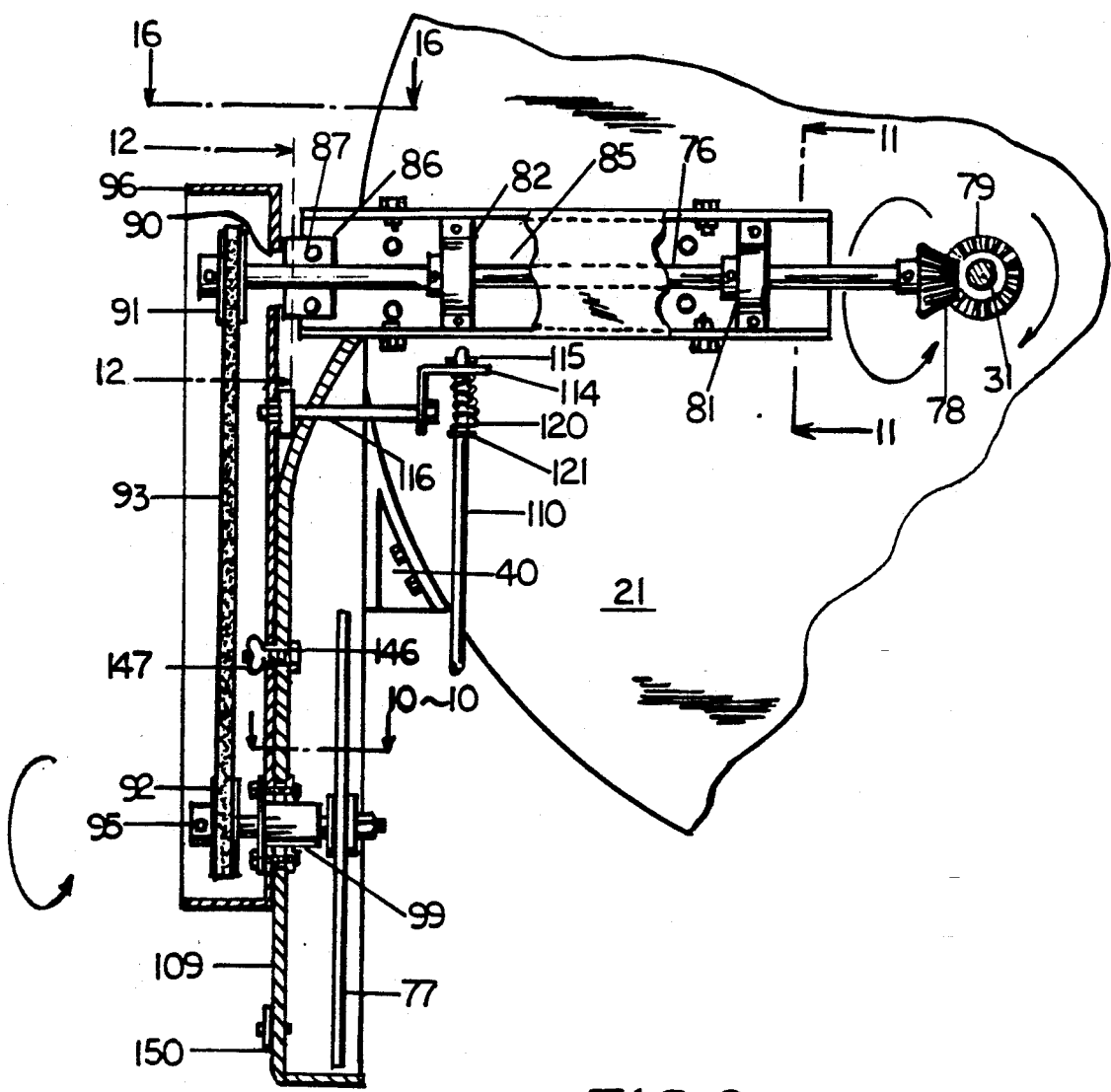
FIG. 9 is a fragmentary sectional top plan view of the edger of the invention with certain parts broken away for purposes of illustration.
Figure 11:
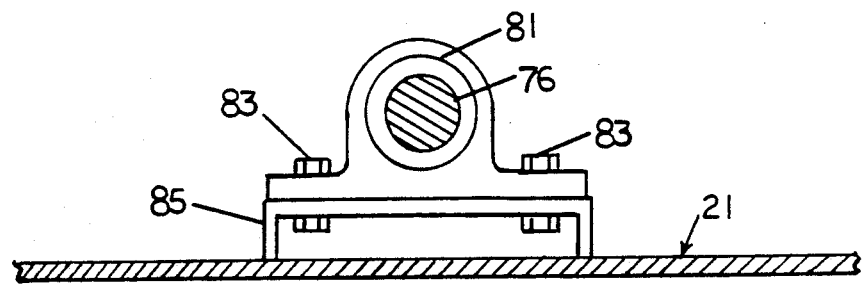
FIG. 11 is a fragmentary sectional view as taken along the line 11—11 in FIG. 9 with parts of the apparatus removed for clarity.
Figure 12:
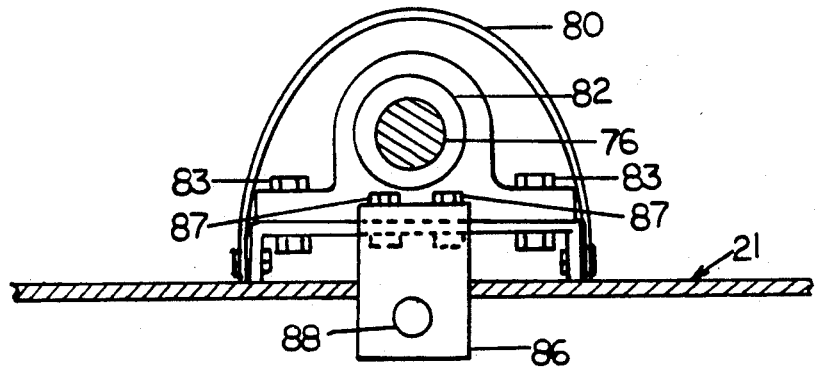
FIG. 12 is a fragmentary sectional view as taken along the line 12—12 in FIG. 9.

Referring more particularly to FIGS. 2, 7 and 9, it will be seen that the power take-off shaft 76 is connected at one end by a bevel gear 78 which meshes with a bevel gear 79 affixed in encircling relation to the axis of the motor drive shaft 31. The gears 78 and 79 are in relation such that the directional plane of the edger blade rotation is substantially tangential and coincident with the directional plane of rotation of the mower blades. The take-off shaft 76 is mounted on a pair of pillow bearing blocks 81,82, each of which is mounted by bolts 83 as shown in FIG. 11 to the top planar face of an elongate U-shaped bracket 85 which is welded or otherwise secured to the top of the deck 21 in inverted "U" relation to the deck 21 which provides space for accommodating the bolts 83. The U-shaped bracket 85 and take-off shaft 76 are mounted to extend in a radial direction of the axis of the motor shaft 31 and in perpendicular relation to the longitudinal axis of the mowing apparatus 20. A cover 80 is provided for the bearings 81,82 and shaft 76 by bolting to the bracket 85 as shown in FIG. 12.

As best seen in FIG. 1, the bracket 85 and take-off shaft 76 both extend beyond the rim of the 21 and accommodate the mounting of the edger 75 thereon. An L-shaped spindle bracket 86 is bolted to the end of the U-shaped bracket 85 by bolts 87 as shown in FIG. 12 with the long leg of the L-shaped bracket depending vertically downward therefrom and being provided with a hole 88 therethrough.

Figure 16:
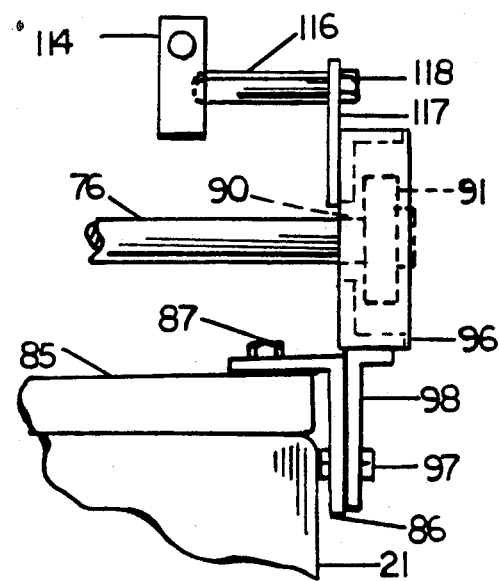
FIG. 16 is a fragmentary view as taken along line 16—16 in FIG. 9.

The take-off shaft 76 extends beyond the end of the U-bracket 85 and is fitted with a pulley 91 fixed to the end of the shaft 76 as shown in FIGS. 9 and 16. The pulley 91 with a second pulley 92 are arranged to accommodate a V-belt drive 93 for the edger blade 77. The second pulley 92 and the edger blade 77 are both mounted on a common shaft 95 which is supported and journalled for rotation at one end of an elongate edger arm 96. The edger arm 96, in turn, is pivotally mounted near its other end to the depending vertical leg of the L-shaped bracket 86 by means of a pivot bolt 97 through the hole 88 and an accommodating hole in a depending flange 98 welded or otherwise affixed to the underside of the edger arm 96. An over-sized hole or slot 90 is formed in the edger arm 96 for accommodating the take-off shaft 76.

Figure 10:
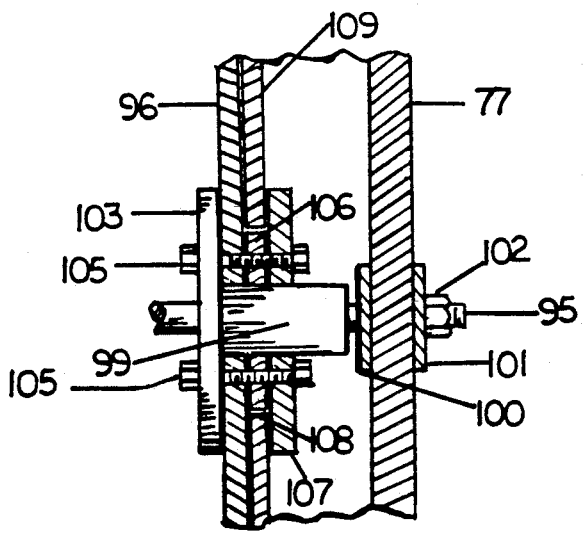
FIG. 10 is a fragmentary sectional view as taken along the line 10—10 in FIG. 9 with parts removed for clarity for showing the mounting on the deck platform 21a of the drive pulley shaft as a power take-off shaft used for driving the blade of the edger component of the apparatus of FIG. 1.

As best seen in FIG. 10, the edger blade shaft 95 is journalled in a bearing housing 99 which extends through an accommodating hole in the edger arm 96. The edger blade 77 is also formed with a hole at its midpoint by which it may be sleeved over the shaft 95 with one side of the blade 77 clamped against an annular washer 100 in abutting engagement with a reduced diameter annular shoulder of the bearing housing and the other side of the blade 77 clamped by a washer 101 and nut 102 threaded on one end of the edger shaft 95. The bearing housing 99 is provided with a second external annular flange 103 with holes therein for accommodating bolts 105 whereby the bearing housing may be bolted to the edger arm 96. A pair of washers 106,107 in side-by-side relation are also clamped against the side of the edge arm 96 by the bolts 105 which extend through bolt holes formed in the washers. The washer 106, which is positioned in engagement with the side of the edger arm 96, is of smaller diameter than the circular flange 103 of the bearing housing whereas the washer 107 has the same outer diameter as the flange 103. Accordingly, the washer 107 is spaced from the edger arm 96 by the smaller washer 106 to thereby form an annular gap or recess 108 of U-shaped cross section, the bottom of which is formed by the outer edge of the smaller washer 106. An edger blade guard 109, to be hereinafter described, is provided with a hole of sufficient diameter to receive the small washer 106 and is mounted for pivotal movement on the edge of the washer 106 about the axis of the blade shaft 95.

As seen in FIGS. 2, 9 and 16, the apparatus 20 is provided with a clutch rod 110 and clutch handle 111 which are operatively connected to the edger arm 96. The clutch handle 111 is mounted at one end by a pivot connection on one side of a U-shaped push bar 113 secured to the rear end of the deck 21. The clutch rod 110 is fastened at one end by a pivot connection to the handle 111 and its other end is received in and extends through an over-sized hole provided in a bracket 114 secured to a pivot bolt 116 as by welding. A cotter pin 115 on the end of the clutch rod prevents its withdrawal through the bracket 114. The bolt 116 is received in and extends through a hole provided in a support bracket 117 mounted on the edger arm 96 and extending upwardly thereon. A nut 118 on the end of the pivot bolt 116 secures the bolt 116 to support bracket 117. A coiled compression spring 120 is sleeved about the clutch rod 110 with one end in abutting engagement with the bracket 114 and its other end in engagement with a C-clip 121 fixed in an annular groove on the clutch rod 110.

It will therefore be seen, that as an operator pushes the clutch handle 111 forward to the position shown in dashed lines in FIG. 2, the clutch rod 110, by means of the compression spring 120 pushes against the bracket 114 which by means of its bolted connection with the bracket 117 urges the edger arm 96 in counter-clockwise pivotal movement on its pivot 97. The movement is such that the edger arm 96 pivots upwardly in the counter clockwise direction as viewed in FIGS. 2 and 7 thereby lifting the edger blade from its ground-engaging operative position. Because of the over-sized slot 90 in the edger arm 96, the pivotal movement of the arm 96 is not restricted by the power take-off shaft 76. Also as the arm 96 moves upwardly in its pivotal movement, the pulleys 91 and 92 move closer together and at a specific angle of elevation of the edger arm 96 the V-belt 93 is loosened thereby removing the power drive to the edger blade and ceasing the edger operation.

For commencing edger operations, the operator places the clutch handle 111 in the position shown in FIG. 2 thereby retracting the clutch rod 110 and effecting pivotal movement of the edger arm 96 in the clockwise direction as viewed in FIGS. 2 and 7. When the motor 30 is operating, the power take-off shaft 76 and V-belt drive produces the rotation of the edger blade. The limits to pivotal movement of the clutch handle 111 is controlled by a clutch plate 122 also fixed to the push bar 113. By means of the clutch plate 122, the clutch handle can be adjusted to a selected angle of pivotal movement to increase or decrease the position and cutting depth of the edger blade. By means of a plurality of angularly spaced notches 123 in the clutch plate 122, each designed to receive a locking tab 124 on the clutch handle, the clutch handle can be locked at any selected position. Preferably, the clutch engages the V-belt drive for the edger at a position of the clutch handle approximately at the mid-point of the notches of the clutch plate.

From the foregoing description of the invention, it is to be seen that simultaneous edging and mowing is possible by the present invention. However, the apparatus 20 is also designed such that as an operator is mowing and edging, the apparatus will also function to vacuum the clippings and debris produced by edging. In this respect, as the primary blade 33 is operational and rotates in the clockwise sense as viewed in FIG. 3, the resulting airlift produced by the rotation of blade 33 becomes an air stream with air being pushed upwardly and forwardly in a spiral-like movement within the deck 21 and creating a powerful vacuuming force underneath the rotating primary blade. While most of the spiral-like air stream moves upwardly within the deck 21, a part of the air stream moves downwardly and escapes beneath the bottom edge of the deck skirt 21b in tangential directions as represented by the arrow 125 in FIG. 3.

When the edger is in operation, the edger blade 77 rotates in the clockwise direction as viewed in FIGS. 2 and 7. As the blade clips the grass, the clippings and dirt are tossed forward toward the rim of the deck 21 with a spiral-like movement resulting from their angular momentum and centrifugal forces acting thereon. Concurrently therewith, the spiral-like air stream which is created by the mower blade 33 and escapes below the bottom edge of the deck skirt 21b is deflected inwardly by the edger blade guard 109 in a path as indicated by arrow 126 in FIG. 3.

Figure 13:
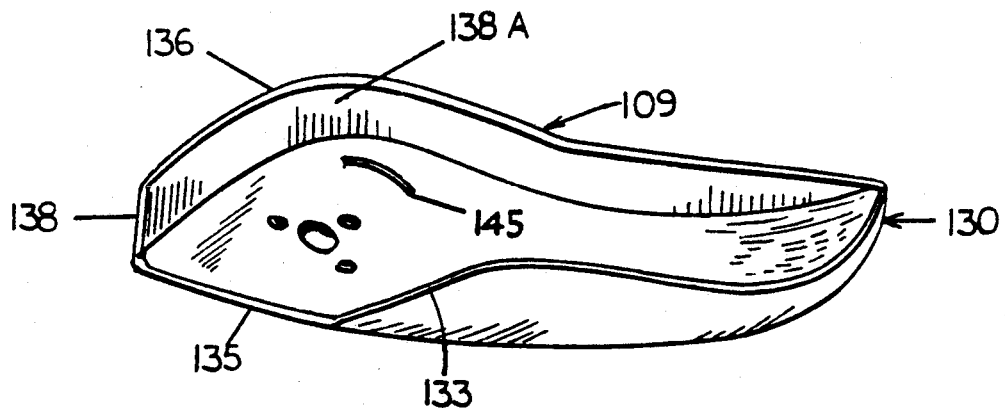
FIG. 13 is an enlarged perspective view of the edger blade guard used with the edger of the invention.
Figure 13:
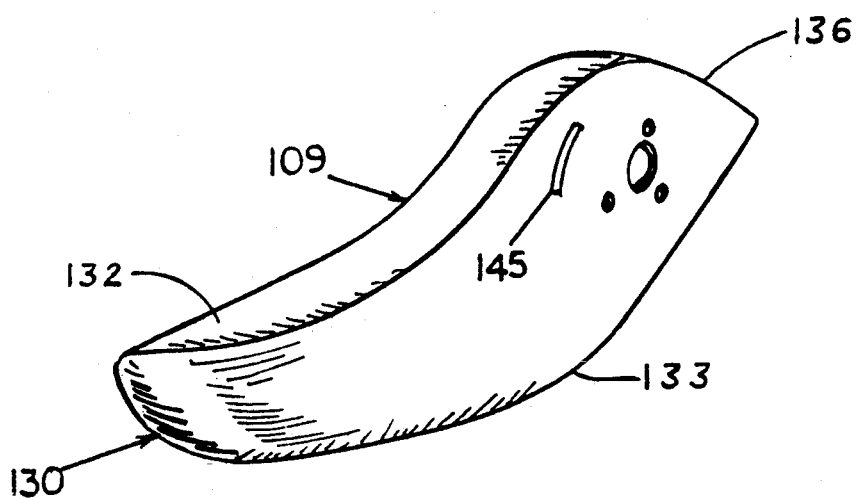

The edger blade guard 109 as illustrated in FIGS. 7, 13 and 13a, is characterized by a forward tail section 130 having a curving lower edge 131 which gradually curves from an upper straight edge 132 of the tail section to a straight bottom edge 133 of the blade guard. In the normal operating position of the edger, the straight edges 132,133 are disposed horizontal. In addition to the tail section 130, the blade guard 109 includes a larger body section having a straight edge 135 which adjoins the bottom straight edge 133 of the tail section at an angle slightly greater than ninety degrees. An upper arcuately curved edge 136 which curves about a center point substantially coincident with the axis of the edger blade shaft 95 joins one end of the straight edge 135 with one end of the top straight edge 132 of the tail 130. As best seen in FIG. 13, the blade guard 109 is provided with an inwardly directed flange 138 which extends inwardly towards the deck skirt 21b from all its peripheral edges excepting the straight edge 135.

As best seen in FIG. 7, the radius of the curved edge 136 is greater than the radius of the edger blade such that the edger blade rotates in a vertical plane beneath the curved section 138A of flange 138 such that all upwardly directed clippings are deflected towards the tail section 130 which guides all the edger clippings, the dirt extracted by the edger blade and the small air stream produced by edger blade rotation into the much larger air stream produced by the primary blade 33 of the mower in the path indicated by the arrow 126 in FIG. 3.

Figure 8:
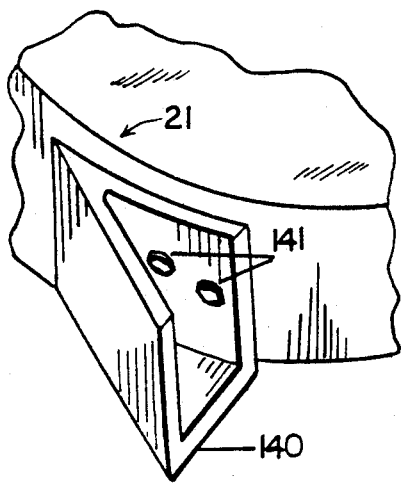
FIG. 8 is a perspective view of a deck guard which is secured to the deck of the apparatus of FIG. 1.

To further assist in guiding the edger debris and clippings, a deck guard 140 is provided which assists the flange 138 of the edger guard 109 in protecting the operator against debris and clippings which might otherwise be thrown by the edger blade. The deck guard 140, as shown in FIGS. 1, 2 and 8, is secured to the outer periphery of the deck skirt 21b by screws 141 at a location so as to extend between the side of the deck 21 and the tail section 130 of the edger guard 109. The deck guard 140 blocks debris and the flow of air from escaping in the vertically upward direction during edging. As a result, the edger clippings and edger generated debris are vacuumed into the deck 21 and are discharged with the mower clippings through the discharge chute 39 for collection when the apparatus 20 is operated in the bagging collection mode. Preferably, the mowing apparatus 20 should always be operated in the non-mulching bagging collection mode when edging.

Also for efficient edger operation, it is desirable that the edger guide guard 109 be maintained in the orientation as shown in FIG. 7 wherein the straight edges 132,133 of the edger guard 109 are maintained parallel with the ground. In this orientation, the vacuuming action is maximized in comparison with an orientation wherein the edger guide guard 109 is oriented with its tail section 130 aimed upwardly rather than at the bottom of deck 21. In this respect, an arcuate slot 145 is provided in the wall of the edger guard 109 such that the edger guard may be pivotally moved about the edger blade shaft 95 and locked in the desired horizontal orientation by means of a bolt 146 which extends through the arcuate slot 145 and an accommodating hole provided in the edger arm 96. A nut 147 is provided on bolt 146 for clamping the edger guard 109 in fixed orientation. Such an adjustment becomes desirable when the angular position of the edger arm 96 is moved to a different position for edging, such as the position shown in dashed lines in FIG. 7.

Also attached to the edger guide guard 109 is an elongate curb guide member 150 which is fixed to the guide guard 109 by bolting or otherwise to extend substantially vertically downward therefrom. The curb guide 150 is of sufficient length that it may be positioned to engage the side edge of a curb, or other object such as a sidewalk or the like when edging and thereby guard against the edger blade striking the curb or other object.

It is also to be noted that when edging with a conventional edger or with conventional combined mower-edger assemblies, it is very difficult to steer and edge around a curve as shown in FIG. 3, and particularly a curved object such as a curb without the wheels of the edger jumping the curb or otherwise interfering with the edging operation. Accordingly, the combined mower edger apparatus 20 of the present invention is provided with front castor wheels 25,26, the axles 25a, 26a of which are swivelly mounted to allow for much easier steering around a curve. In addition, the front wheel 25 and rear wheel 27 which are both on the same side of the apparatus 20 as the edger assembly are aligned and disposed much closer to the longitudinal center line 151 of the apparatus 20 as shown in FIG. 1 than are the wheels 26 and 28. By this non-symmetrical arrangement of wheels, the wheels on the same side of the deck 21 as the edger are offset from the edger blade at a distance sufficient to allow these wheels to stay on the lawn grass during an edging operation around a curve.

Figure 14:
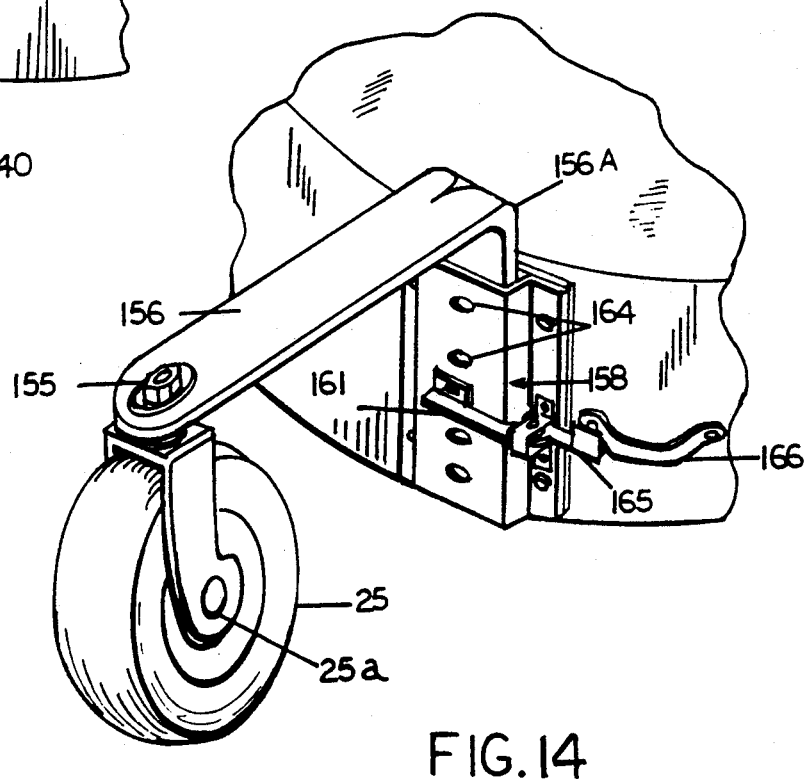
FIG. 14 is a fragmentary perspective view of the invention for showing the mounting of a swivel castor wheel on the front of the deck.
Figure 15:
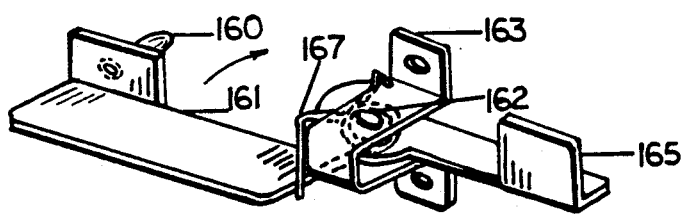
FIG. 15 is an enlarged perspective view of a locking device used in adjusting the height of the apparatus of FIG. 1.

Frequently, it is desirable to make it easier to maneuver the apparatus 20, particularly when edging around a curve. Accordingly, as seen in FIG. 14, each front wheel 25,26 is mounted by a swivel connection 155 on the end of one leg of an L-shaped bracket 156. The shorter leg 156A of bracket 156 is received in the space defined by an elongate bracket 158 of U-shaped cross section and having flanges extending along each leg which are bolted to the deck skirt 21b in an orientation to provide a vertical channel by the space between the webbed section of the bracket 158 and the deck skirt 21b. A plurality of vertically spaced holes 164 are provided in the webbed section of the bracket 158 and a single hole (not shown) is provided in the short leg 156A of the L-bracket 156 whereby a locking pin 160 on a pivotal locking arm 161 is selectively placed through any one of the holes in the bracket 158 and the hole in the bracket leg 156A. The locking pin 160 is integrally formed or welded at one end of arm 161 which is pivotally mounted intermediate its ends on a shaft 162 fixed in a bracket 163 fastened to the deck skirt 21b. The pin 160 is provided with a tapered pointed tip for accommodating its insertion in the holes of bracket 158. By means of a spirally coiled spring 167 having its inner end fastened to the bracket 163 and its outer end in forceful abutting engagement with the pivot arm 161 at a location intermediate the pivot shaft 162 and locking pin 160, a biasing force is continually applied to urge the locking pin to locking position. The end of the pivot arm 161 remote from the locking pin forms a handle or lever 165 which when pushed in the direction of the deck skirt 21b causes the retraction and release of the locking pin whereby the wheel supporting bracket 156 may be adjusted vertically to align a different hole 164 of the bracket 158 with the hole in the bracket leg 156A. Preferably, a gripping handle 166 is fixed on the skirt 21b adjacent the pivot handle 165 so a person may simultaneously grip both handles and by a squeezing action effect the pivotal movement of the pivot arm 161 for release of the locking pin.

It is to be appreciated that both front wheels 25,26 should be similarly adjusted with respect to deck height and in correspondence with adjustment of deck height at the rear of the deck by the height adjuster 44 so that the deck 21 and its rotary blades 33,35 maintain a horizontal orientation.

It will therefore be seen that a unique apparatus comprising a mulching mower with attached edger is disclosed herein which is provided with a variable mulching control valve for selectively adjusting the proportions of mulching and grass clippings collection which may be performed simultaneously during a mowing operation. The mower is also provided with dual rotary blades arranged in a unique angular orientation and vertical spacing which in conjunction with a unique air stream deflector mounted internally of the deck result in almost all of the grass clippings being subjected to at least three or more cutting actions for producing a finer mulch. In addition, the edger and mower are provided with means including the orientation of their cutting blades and their direction of rotation such that during simultaneous operation the air streams produced by their cutting blades are enforcing to one another and enhance the capability of the apparatus for the vacuuming of clippings and the debris from edging. Furthermore, the provision of adjustable swivel caster wheels on the front of the apparatus and a non-symmetrical arrangement of wheels wherein the wheels on the edger side of the apparatus are spaced in closer proximity to the center line of the apparatus and at greater distance from the plane of edger blade rotation provides for easier steering and enhanced capability for edging about a curve or along a curve object such as a curb or sidewalk.

It is to be understood that the foregoing description of a preferred embodiment of the invention has been presented for purposes of explanation and illustration and is not intended to limit the invention to the precise form disclosed. Many of the unique features of the invention are adaptable for use in conventional rotary mowers or edgers which are not in combined arrangement with one another. For example, the provision of dual blades and an internal deck deflector for finer mulching might be included in a conventional mower. A conventional rotary mower might also be provided with a variable mulching control valve. The unique edger blade guard of the subject invention could also be used to good effect in a conventional edger apparatus.

Furthermore, while the invention is particularly adaptable to a motorized mower equipped with transmission for rear wheel drive, it could also be used with a motorized mower which must be manually pushed.

Also, the edger assembly while shown attached to the left of the mower could as well be attached on the right.

It is to be appreciated therefore that many changes may be made by those skilled in the art without departing from the spirit of the invention.

What is claimed is:

1. A lawn mowing and trimming apparatus comprising:

a mobile deck member having an upper platform and a pair of front wheels and a pair of rear wheels mounted thereto, said deck member having a deck skirt member extending downwardly from along the periphery of said upper platform to a spaced distance above the plane defined by the lower surfaces of said wheels;

a motor mounted on said deck member, said motor having a motor drive shaft extending downwardly through said upper platform;

an elongate primary rotary cutting blade affixed substantially at its mid-point to said motor drive shaft in a substantially perpendicular radial orientation with respect to the shaft axis;

a secondary rotary cutting blade affixed substantially at its mid-point to said motor drive shaft in a substantially perpendicular radial orientation with respect to the shaft axis, said second rotary cutting blade being vertically spaced above said primary blade and being mounted on said motor drive shaft at an acute leading angle with respect to said primary blade in the direction of blade rotation, said primary blade having upturned upwardly facing surfaces at its end portions which induce a vortex-like air stream within said deck member upon rotation of said primary blade;

a discharge chute mounted to said deck member and having an inlet communicating with the volumetric space interiorly of said skirt member and below said deck platform; and a deflector means formed by an inwardly curving projection of a portion of said deck skirt member whereby the air stream created by the rotation of said blades is adapted to carry the grass clippings produced by the cutting action of said primary blade in a deflector-directed spirally curving path toward the rotative axis of said blades whereby said clippings are cut into finer particles by at least a second cutting by said secondary blade and a third cutting by said primary blade and said finer particles are adapted to be deposited on said lawn, said apparatus being adapted to be moved across a lawn during a mowing operation.

2. A lawn mowing and trimming apparatus as set forth in claim 1 further including an adjustable mulching control valve means for varying the proportion of grass clippings which are delivered to said discharge chute for collection and the proportion of grass clippings which are returned to the lawn as a mulch during a mowing operation of said apparatus, said proportions being variable in the range of zero to one hundred percent.

3. A lawn mowing and trimming apparatus as set forth in claim 2 wherein said mulching control valve means comprises a valve element mounted at the inlet of said discharge chute, said inlet being located at a position with respect to the path of the air stream which receives the clippings prior to their interruption by said deflector, and means for selectively placing said valve element in a range of positions including a first position wherein the inlet to the discharge chute is fully open whereby all of the clippings produced in a mowing operation are discharged through said discharge chute for bagging, a second position wherein the inlet to the discharge chute is closed whereby all clippings produced in a mowing operation are deposited to the lawn as mulch, and to any position intermediate said first and second positions wherein the inlet to the discharge chute is partially open whereby a portion of the grass clippings are discharged through the discharge chute and the remaining portion of grass clippings fall back to the lawn as a mulch.

4. A lawn mowing and trimming apparatus as set forth in claim 1 and further including:

a power take-off shaft extending laterally from said motor drive shaft and coupled thereto by a gearing drive connection;

an edger assembly mounted on one side of said deck member, said edger assembly including an edger arm mounted on said deck member for pivotal movement relative thereto;

an edger blade mounted on said edger arm at a location remote from the pivot point for rotary movement in a vertical plane;

drive means adapted to interconnect said power take-off shaft with said edger blade for effecting rotation of the edger blade;

clutch means which are manually operable for releasing or connecting said drive means to rotate said edger blade; and means comprising an edger blade guard attached to said edger arm for guiding the edger air stream generated by rotation of the edger blade and the edger clippings carried by said edger air stream to join and enforce the air stream produced by said primary mower blade and enhance the suction force produced by the merged air streams for vacuuming the grass clippings produced by said edger blade.

5. A lawn mowing and trimming apparatus as set forth in claim 4 wherein both of said pair of front wheels are swivelly mounted castor wheels.

6. A lawn mowing and trimming apparatus as set forth in claim 5 wherein the front wheel and rear wheel which are mounted on the same side of the deck member as the edger assembly are mounted at a distance closer to the center line of the apparatus than the other two wheels to facilitate the operation of the edger blade along a curve during an edging operation.

7. A lawn mowing and trimming apparatus as set forth in claim 5 further including means for mounting each of said front swivelly mounted castor wheels to said deck for adjusting the vertical height of the deck above the front wheel axles and a lawn to be cut.

8. A lawn mowing and trimming apparatus as set forth in claim 1 wherein said second rotary cutting blade is provided with a flat upper surface and a downwardly facing beveled leading surface which intersect to form the cutting edge of said second blade and said flat upper surface is disposed at a positive angle of attack with respect to the horizontal plane so as to produce an enhanced downdraft during rotation for quicker discharge of the second blade clippings to the ground.

9. A lawn mowing and trimming apparatus as set forth in claim 1 wherein the portions of said secondary rotary cutting blade which extend radially outward with respect to said motor shaft axis are formed at an angle of dihedral with respect to the horizontal plane whereby the clipping particles produced by said secondary blade are pushed outwardly therefrom to result in finer mulching because of the finer cutting produced by the greater angular velocity of the end portions of the lower primary rotary cutting blade.

10. A lawn mowing and trimming apparatus as set forth in claim 9 wherein portions of secondary cutting blade which extend radially from the motor shaft axis are at an angle of dihedral of approximately 10°.

11. A lawn mowing and trimming apparatus comprising a mobile deck member having an upper platform and a pair of front wheels and a pair of rear wheels mounted thereto, said deck member having a deck skirt member extending downwardly from along the periphery of said upper platform to a spaced distance above the plane defined by the lower surfaces of said wheels;
- a motor mounted on said deck member, said motor having a motor drive shaft extending downwardly through said upper platform;
- at least one elongate primary rotary cutting blade affixed substantially at its mid-point to said motor drive shaft in a substantially perpendicular radial orientation with respect to the shaft axis, said primary cutting blade having upturned upwardly facing surfaces at its end portions which create a vortex-like air stream within said deck member upon rotation of said primary blade and a suction force beneath said primary blade for vacuuming grass clippings into said air stream;
- a power take-off shaft extending laterally from said motor drive shaft and coupled thereto by a gearing drive connection;
- an edger assembly mounted on one side of said deck member, said edger assembly including an edger arm mounted on said deck member for pivotal movement relative thereto;
- an edger blade mounted on said edger arm at a location remote from the pivot point for rotary movement in a vertical plane;
- drive means adapted to interconnect said power take-off shaft with said edger blade for effecting rotation of the edger blade;
- clutch means which are manually operable for releasing or connecting said drive means to operate said edger; and
- means comprising an edger blade guard attached to said edger arm for guiding the edger air stream generated by rotation of the edger blade and the edger clippings carried by said edger air stream to join and enforce the air stream produced by said primary mower blade and enhance the suction force produced by the merged air streams for vacuuming the grass clippings produced by said edger blade.

12. A lawn mowing and trimming apparatus as set forth in claim 11 further including a discharge chute mounted to said deck member and having an inlet communicating with the volumetric space interiorly of said skirt member and below said deck platform.

13. A lawn mowing and trimming apparatus as set forth in claim 12 further including
- a deflector means formed by an inwardly curving projection of a portion of said deck skirt member whereby the air stream created by the rotation of said blades is adapted to carry the grass clippings produced by the cutting action of said primary blade in a deflector-directed spirally curving path toward the rotative axis of said blades whereby said clippings are cut into finer particles by at least a second cutting by said secondary blade and a third cutting by said primary blade and said finer particles are adapted to be deposited on said lawn; and
- an adjustable mulching control valve means for varying the proportion of grass clippings which are delivered to said discharge chute for collection and the proportion of grass clippings which are returned to the lawn as a mulch, said proportions being variable in the range of zero to one hundred percent.

14. A lawn mowing and trimming apparatus as set forth in claim 13 wherein said mulching control valve means comprises a valve element mounted at the inlet of said discharge chute, said inlet being located at a position with respect to the path of the air stream which receives the clippings prior to their interruption by said deflector, and means for selectively placing said valve element in a range of positions including a first position wherein the inlet to the discharge chute is fully open whereby all of the clippings produced in a mowing operation are discharged through said discharge chute for bagging, a second position wherein the inlet to the discharge chute is closed whereby all clippings produced in a mowing operation are deposited to the lawn as mulch, and to any position intermediate said first and second positions wherein the inlet to the discharge chute is partially open whereby a portion of the grass clippings are discharged through the discharge chute and the remaining portion of grass clippings fall back to the lawn as a mulch.

15. A lawn mowing and trimming apparatus set forth in claim 12 wherein both of said pair of front wheels are swivelly mounted castor wheels.

16. A lawn mowing and trimming apparatus as set forth in claim 15 where in the front wheel and rear wheel which are mounted on the same side of the deck member as the edger assembly are mounted at a distance closer to the center line of the apparatus than the other two wheels to facilitate the operation of the edger blade along a curve during an edging operation.

17. A lawn mowing and trimming apparatus as set forth in claim 15 further including means for mounting each of said front swivelly mounted castor wheels to said deck for adjusting the vertical height of the deck relative to said front wheels.

18. A lawn mowing and trimming apparatus comprising:
- a mobile deck member having an upper platform and a pair of front wheels and a pair of rear wheels mounted thereto, said deck member having a deck skirt member extending downwardly from along the periphery of said upper platform to a spaced distance above the plane defined by the lower surfaces of said wheels;
- a motor mounted on said deck member, said motor having a motor drive shaft extending downwardly through said upper platform;
- an elongate primary rotary cutting blade affixed substantially at its mid-point to said motor drive shaft in a substantially perpendicular radial orientation with respect to the shaft axis;
- a secondary rotary cutting blade affixed substantially at its mid-point to said motor drive shaft in a substantially perpendicular radial orientation with respect to the shaft axis, said second rotary cutting blade being vertically spaced above said primary blade and being mounted on said motor drive shaft at an acute leading angle with respect to said primary blade in the direction of blade rotation, said primary blade having upturned upwardly facing surfaces at its end portions which induce a vortex-like air stream within said deck member upon rotation of said primary blade whereby said clippings are cut into finer particles by said blades and said finer particles are adapted to be deposited on said lawn, said apparatus being adapted to be moved across a lawn during a mowing operation.

19. A lawn mowing and trimming apparatus as set forth in claim 18 wherein portions of said secondary cutting blade which extend radially from the motor shaft axis are at an angle of dihedral of approximately 10°.

20. A lawn mowing and trimming apparatus as set forth in claim 18 further including;
a deflector means formed by an inwardly curving projection of said deck skirt member whereby the air stream created by the rotation of said blades is adapted to carry the grass clippings produced by the cutting action of said primary blade in a deflector-directed spirally curving path toward the rotative axis of said blades.

21. A lawn mowing and trimming apparatus comprising a mobile deck member having an upper platform and a pair of front wheels and a pair of rear wheels mounted thereto, said deck member having a deck skirt member extending downwardly from along the periphery of said upper platform to a spaced distance above the plane defined by the lower surfaces of said wheels;
a motor mounted on said deck member, said motor having a motor drive shaft extending downwardly through said upper platform;
at least one elongated rotary cutting blade affixed substantially at its mid-point to said motor drive shaft in a substantially perpendicular radial orientation with respect to the shaft axis, said elongated cutting blade having upturned upwardly facing surfaces at its end portions which create a vortex-like air stream within said deck member upon rotation of said primary blade and a suction force beneath said cutting blade for vacuuming grass clippings into said air stream,
a discharge chute mounted to said deck member and having an inlet communicating with the volumetric space interiorly of said skirt member and below said deck platform, and
an adjustable mulching control valve means for varying the proportion of grass clippings which are delivered to said discharge chute for collection and the proportion of grass clippings which are returned to the lawn as a mulch during a mowing operation of said apparatus, said proportions being variable in the range of zero to one hundred percent.

22. A lawn mowing and trimming apparatus as set forth in claim 21 and further comprising;
a deflector means formed by an inwardly curving projection of a portion of said deck skirt member whereby the air stream created by the rotation of said blades is adapted to carry the grass clippings produced by the cutting action in a deflector-directed spirally curving path toward the rotation axis of said blade.

* * * * *